United States Patent [19]

Ambrose et al.

[11] Patent Number: 4,540,771

[45] Date of Patent: Sep. 10, 1985

[54] HIGH SOLIDS POLYESTER POLYOLS AND RESINOUS POLYOLS THEREOF

[75] Inventors: Ronald R. Ambrose, Allison Park; Wen-Hsuan Chang; David T. McKeough, both of Gibsonia; John R. Peffer, Pittsburgh, all of Pa.

[73] Assignee: PPG Industries, Inc., Pittsburgh, Pa.

[21] Appl. No.: 656,562

[22] Filed: Oct. 1, 1984

[51] Int. Cl.³ .................................................. C08G 63/02
[52] U.S. Cl. ...................................... 528/272; 528/83; 528/288; 528/302; 528/308
[58] Field of Search ................. 528/83, 272, 288, 302, 528/308

[56] References Cited

U.S. PATENT DOCUMENTS

| | | | |
|---|---|---|---|
| 3,007,899 | 11/1961 | Urs | 260/75 |
| 4,010,311 | 3/1977 | Lewis et al. | 428/424 |
| 4,211,858 | 7/1980 | Wada et al. | 528/272 |
| 4,254,246 | 3/1981 | Dicoi et al. | 528/272 X |
| 4,284,750 | 8/1981 | Amirsakis | 528/79 |
| 4,338,431 | 7/1982 | König et al. | 528/272 |

FOREIGN PATENT DOCUMENTS 56066 11/1974 Australia .

*Primary Examiner*—Lucille M. Phynes
*Attorney, Agent, or Firm*—Godfried R. Akorli

[57] ABSTRACT

There are disclosed herein polyester polyols, resinous polyols thereof, and coating compositions formulated therewith. The polyester polyols are prepared by typically reacting a large excess of low molecular weight polyols with polycarboxylic acid or functional equivalents thereof. The polyols are employed in amounts sufficient to produce reaction products containing a significant amount of unreacted polyols which can be subsequently removed by means such as vacuum distillation.

18 Claims, No Drawings

HIGH SOLIDS POLYESTER POLYOLS AND RESINOUS POLYOLS THEREOF

BACKGROUND OF THE INVENTION

1. Field of the Invention

The present invention relates to resinous polyols which are particularly useful in high solids coating compositions. More specifically, the present invention relates to high solids polyester polyols which are prepared by reacting low molecular weight polyols with polycarboxylic acids or functional equivalents thereof, wherein the reaction product is characterized by the presence of a significant amount of unreacted starting polyols.

2. Brief Description of the Prior Art

In preparing resinous polyols, particularly low molecular weight ones, the full implications of using a large excess of starting low molecular weight simple polyols had not been appreciated in the art. Certainly, the significance of using a large excess of starting polyols, followed by removing a substantial portion of the attendant unreacted starting polyols from reaction products had not been appreciated in the art. Specifically, it had not been appreciated that by removing unreacted starting polyols, performance properties of coating compositions comprising the resultant resinous polyol could be affected significantly.

In the prior art preparation of low molecular weight resinous polyols, there are employed controlled amounts of starting polyols. The amounts of starting polyols are controlled in such a manner as would produce resinous polyols containing tolerable amounts of unreacted starting polyols. Usually, unreacted starting polyols in these amounts, i.e., up to about 5 percent, are not considered detrimental and therefore are not intentionally removed from the reaction product.

In the somewhat related areas of preparing high molecular weight resins, low molecular weight polyols are sometimes removed as by-products of the polymerization process. The intent or effect of removing the polyols is quite different from that of the present invention. In these areas, removal of polyols is necessary to obtain the desired high molecular weight products. For example, in preparing high molecular weight polyesters for fiber manufacture, low molecular weight polyester polyols are made to undergo transesterification reaction. This results in an increase in molecular weight and is accompanied by formation of low molecular weight polyols as by-products. Removal of the low molecular weight polyol by-products from the reaction mixture is critical to the formation of the high molecular weight polyesters. In other areas of preparing high molecular weight polyester polyols, polyols can be removed as a corrective measure, with a consequential molecular weight increase in the resultant polyester polyol.

In the present invention, starting polyols can be employed in relatively large excess with the intent of substantially increasing the low molecular weight and narrow molecular weight distribution of the resultant resinous polyols. While the reaction product is attended by a significant amount of unreacted starting polyol, a portion or all of the unreacted starting polyol can be subsequently removed from the reaction product. Thus, the low molecular weight and narrow molecular weight distribution of the resinous polyol is optimized.

SUMMARY OF THE INVENTION

The present invention encompasses a polyester polyol having a number average molecular weight of up to about 1000 which is prepared by reacting a low molecular weight starting polyol with a polycarboxylic acid or a functional equivalent thereof, wherein the starting polyol is in an amount sufficient to produce a reaction product containing "significantly high amounts", i.e., about 16 percent or higher, and preferably about 21 percent or higher of unreacted starting polyol based on the weight of the reaction product.

The invention further encompasses a polyester polyol having a low number average molecular weight of up to about 1000 which is prepared by reacting a polyol with a polycarboxylic acid or a functional equivalent thereof, wherein the starting polyol is in an amount sufficient to produce a reaction product containing a "significant amount" of unreacted starting polyol, i.e., about 5 percent or higher, and preferably 15 percent or higher unreacted starting polyol, based on the weight of the reaction product. Integrally, this is followed by removing about 30 percent by weight or higher of the unreacted starting polyol from the reaction product under essentially non-reacting conditions. Removal of the unreacted starting polyol can be effected by physical means such as distillation which is preferred, or by alternate means such as crystallization or extraction.

In specific embodiments, the present invention encompasses a polyester polyol having a number average molecular weight of up to about 1000 which is prepared by reacting a diol with a dicarboxylic acid, a dicarboxylic acid anhydride or a lower alkyl ester, wherein the starting diol is employed in an amount sufficient to produce a reaction product containing about 5 percent or higher and preferably about 15 percent or higher of the unreacted starting diol. This is followed by removing about 30 percent by weight or higher of the unreacted starting diol, under essentially non-reacting conditions.

The polyester polyols of this invention can be further reacted with an acid, an anhydride, a lactone, an isocyanate or the like to form resinous polyols of varying molecular weight. The further reaction can be conducted before or after the removal of the unreacted starting polyol. The resultant product will be different, depending on whether the further reaction is before or after the removal of unreacted starting polyol.

In the practice of this invention, thermosetting coating compositions can be formulated with the above polyester polyol or resinous polyol thereof, in combination with curing agents such as aminoplasts, phenoplasts and polyisocyanates. The coating compositions can be of a high solids type. They can have sprayability at a solids content of about 40 percent or higher. As such, the coating compositions of this invention can have relatively low volatile organic content (VOC).

In this text, the terms molecular weight, solids content, sprayability and volatile organic content (VOC) are defined as follows. The term "molecular weight" refers to a number average molecular weight as determined by gel permeation chromatography using a glycol standard. Therefore, it is not the actual number average molecular weight which is measured but a number average molecular weight which is relative to the glycol standard. The number average molecular weight herein excludes contributions by unreacted starting polyols.

The solids (i.e., the non-volatile) content of the resinous polyol is determined by ASTM D-2369 testing modified as follows: 0.5 grams of the resinous polyol (i.e., the reaction mixture which may comprise unreacted polyol) is mixed with 5 milliliters of 1:1 mixture of acetone and tetrahydrofuran and heated at 105° C. for 2 hours in a forced draft oven. The resinous polyol is then cooled in a desiccator, reweighed and the non-volatile content calculated. The percentage by weight of the resinous polyol remaining is reckoned as the solids content. By this method, the unreacted starting polyol usually would be volatile and would not be included as the "solid".

The term "sprayability" means the maximum concentration of solids at which the coating composition can be atomized sufficiently to form a uniformly deposited coating, under normal spraying conditions of, say, temperature, pressure, and spray equipment design such as entails the use of an air suction gun operating of 60 psi with a No. 30 air cap. This maximum concentration is solvent dependent and usually occurs in a viscosity range of 20 to 24 and preferably at about 22 seconds with a No. 4 Ford cup at room temperature after thinning with a solvent such as a mixture of methyl amyl ketone and ethoxyethyl acetate. Above this maximum concentration, appearance as manifested by leveling and solvent popping typically becomes unacceptable.

The VOC is defined as the weight per volume of any compound of carbon which evaporates from a paint or related coating material under the specific conditions for the determination of the non-volatile content of that material. This does not include water which is volatile under the test conditions. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the water content. The determination of the VOC is by ASTM D-3960 testing which entails heating the paint or related coating material at 110° C. for 1 hour.

In this text, the term "significant amount" refers to an amount that is equal to or more than the tolerable amount of unreacted starting polyol that is found in some art-known polyester polyols. Heretofore, amounts of unreacted starting polyol in excess of the tolerable amounts would have been considered detrimental because of presumed associate negatives which are discussed hereinafter. The term "significantly high amount" is used in distinction to denote an amount that is substantially more than the tolerable amounts. An estimate of the unreacted starting polyol can be obtained from the resin solids content of the polyester polyol. Alternately, an estimate of the unreacted starting polyol can be obtained by GPC.

The GPC estimate of the unreacted starting polyol content can be obtained by using the area of the unreacted starting polyol peak in relation to the total area under all components of the chromatogram.

Percent unreacted starting polyol =

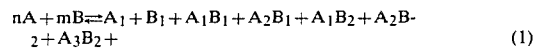

The percent unreacted starting polyol calculated is based on the assumption that the detector gives the same weight to area response for all components.

DETAILED DESCRIPTION OF THE INVENTION

The claimed invention encompasses in one aspect, polyester polyols containing "significantly high amounts", i.e., about 16 percent or higher, and preferably about 21 percent or higher of unreacted starting polyols wherein the unreacted starting polyols are not removed from the reaction product. As fully explained hereinafter, these polyester polyols are advantaged by the preponderance of low molecular weight species and narrow molecular weight distribution of the polyester polyol in the reaction product. They have utility as intermediates for preparing other resinous materials, and can have utility in their own right as film-formers such as low temperature-curable film-formers.

To be sure, there are known in the art polyester polyols containing unreacted starting polyols. However, unreacted starting polyols are present in substantially lower amounts. Hence, the instant polyester polyols containing significantly high amounts of unreacted starting polyols are believed to be novel.

In the other aspect, the claimed invention encompasses polyester polyols containing a "significant amount", i.e., about 5 percent or higher, typically about 10 percent or higher, and preferably about 15 percent or higher of unreacted starting polyol which is removed in part or in all. These polyester polyols are of optimized low molecular weight and narrow molecular weight distribution. They can be formulated into high solids coating compositions of high sprayability and low VOC. Surprisingly, it has been found that when the unreacted starting polyols are removed, there can be improved in performance properties such as flexibility and overbake tolerance of coating compositions of the polyester polyols.

The preparation of the polyester polyols of this invention involve, generally, condensation reactions. The distribution of species in the resultant product is illustrated by Flory's theory which is known to those skilled in the art. In accordance with the Flory equation, for example, when a glycol A condenses with a dicarboxylic acid B to form a reaction product comprising a polyester polyol, there is obtained a distribution of species which may be described as follows:

$$nA + mB \rightleftharpoons A_1 + B_1 + A_1B_1 + A_2B_1 + A_1B_2 + A_2B_2 + A_3B_2 + \quad (1)$$

where A and B denote a starting glycol and dicarboxylic acid, respectively, n and m are the number of moles of A and B charged, and the subscripts denote the number of A and B units in a particular species. If the reaction is carried out with excess glycol ($n > m$) and the reaction is carried out to completion (acid values approaching zero), the species which contain acid functional groups become negligible, and equation (1) simplifies to:

$$nA + mB \rightleftharpoons A_1 + A_2B_1 + A_3B_2 + A_4B_3 + A_5B_4 \quad (2)$$

The mole fraction distribution, $F(r)$, and the weight fraction distribution, $W(r)$, of the polyester polyol can be calculated as follows:

$$F(r)_{A_{r+1}B_r} = (1 - \beta)\beta^r \quad (3)$$

$$W(r)_{A_{r+1}B_r} = \frac{F(r)_{A_{r+1}B_r} MW_{A_{r+1}B_r}}{\sum_{r=0}^{\infty} F(r)_{A_{r+1}B_r} MW_{A_{r+1}B_r}} \quad (4)$$

where $\beta$ is the extent of reaction of hydroxyl groups and this is m/n when the reaction is carried to completion, i.e., to an acid value of zero, r is the number of dicarboxylic acid units, i.e., B units per molecule, and MW is the molecular weight of the $A_{r+1}B_r$ species. As would be realized, the species $A_2B_1$ and to some extent $A_3B_2$ are most desirable for high solids compositions.

To obtain these polyester polyols, it was theorized that one would have to employ relatively higher quantities of starting polyols. Apparently, this theory found only limited application because the higher quantities of starting polyols resulted in correspondingly high quantities of unreacted starting polyols which were believed to have the following associate negatives. The unreacted starting polyols which are in the nature $A_1$ are of relatively very low molecular weight. Hence, they may volatilize during heat curing of coatings containing same. If cured into coatings with curing agents such as melamines, they may impart brittleness to the coating.

In view of the above negatives, the art has suggested that in preparing low molecular weight resinous polyols for coatings with low VOC, there is a point of diminishing returns beyond which the use of still higher quantities of starting polyols either produces no change in VOC or causes an increase in VOC. Apparently, at this point, there are present intolerable amounts of unreacted starting polyols in the reaction product.

The present invention exceeds the prohibitive point of diminishing returns. Hence, the polyester polyols of this invention contain a "significant" or "significantly high" amounts of unreacted starting polyols. Advantageously, the polyester polyols are characterized by a preponderance of low molecular weight species and a narrow molecular weight distribution. When the unreacted starting polyols are removed, the polyester polyols are further characterized by optimized narrow molecular weight distribution.

This aspect of the invention is demonstrated below by the preparation of high solids polyester polyols. The preparation entails the reactions of a diol, e.g., neopentyl glycol (molecular weight of 104) with a diacid, e.g., hexahydrophthalic acid (molecular weight of 172), in different mole ratios, to 100 percent extent of reaction. The weight percent of the various species $A_1$, $A_2B_1$, $A_3B_2$ and the like can be calculated from the Flory equations. The calculated results are shown below.

TABLE I

| Mole Ratio Diol/Diacid | Weight Percent of Unreacted Diol $A_1$ | Weight Percent of Desired Low Molecular Weight Species $A_2B_1$ | Weight Percent of Higher Molecular Weight Species $A_3B_2$ + ... |
|---|---|---|---|
| (i) 1.5:1 | 5.5 | 13.5 | 81.0 |
| (ii) 1.7:1 | 9.1 | 19.4 | 71.5 |
| (iii) 2.0:1 | 14.4 | 26.2 | 59.4 |
| (iv) 2.3:1 | 19.4 | 30.8 | 49.8 |
| (v) 3.0:1 | 29.5 | 35.9 | 34.1 |
| (vi) 4.0:1 | 40.9 | 37.3 | 21.8 |

As can be seen from the above Table, more of the $A_2B_1$ species and less of $A_3B_2$ and higher species are obtained with increasing diol/diacid ratios. Associated with the increasing ratios, however, are increasing amounts of unreacted glycol. In accordance with this invention, all or part of the unreacted glycol can be removed under non-reacting conditions. With the unreacted glycol removed, the polyester polyol contains high proportions of the desired low molecular weight $A_2B_1$ species as shown in the above table. In accordance with this invention, the unreacted starting polyols are removed in amounts sufficient to give the desired solids content and performance properties in the cured film.

Typically, about 30 percent, and preferably from about 60 percent or higher of the unreacted starting polyol can be removed from the reaction product under essentially "non-reacting conditions". The percent is by weight and is based on the weight of the unreacted starting polyol. By non-reacting conditions herein is meant the conditions under which the unreacted polyol is removed by, say, distillation, wherein further reactions such as transesterification are minimized. In such instances, the non-reacting conditions would be a function of temperature, pressure, catalyst level, nature of the polyester polyol and the unreacted polyol in question and the like.

Illustratively, it is preferred that the temperature at which the unreacted starting polyol is removed be lower than the temperature at which the polyester polyol is prepared. It is also preferred that catalysts for the preparation of the polyester polyol be employed at low levels. Alternatively, if the catalyst is present at high levels, it should be removed or neutralized before the removal of the unreacted starting polyol. As would be realized, relatively higher temperatures and/or levels of catalyst would render the polyester polyol more susceptible to further reaction.

The following is a description of the useful reactants of this invention and the processing thereof to produce the instant polyester polyols. The starting polyols useful herein are low molecular weight simple polyols which are distinguishable from polymeric polyols. One or more polyols can be employed; they can be cyclic or acyclic, or a mixture thereof. Examples of the cyclic polyols are 1,4-cyclohexanediol and 1,4-cyclohexanedimethanol. Examples of the acyclic polyols are those containing, preferably, from about 2 to 14, more preferably 3 to 10, and most preferably 3 to 6 carbon atoms. Examples of the acyclic polyols are propylene glycol, diethylene glycol, 1,4-butanediol, neopentyl glycol, 1,6-hexanediol, trimethylpentanediol and dipropylene glycol. The use of low molecular weight diols or glycols is preferred herein. Higher functionality polyols such as triols, although not preferred, can be used, preferably in admixture with the diols. An example of the higher functional polyol is trimethylolpropane.

One or more polycarboxylic acids can be employed in the preparation of the polyester polyol. The polycarboxylic acids can be cyclic or acyclic, or a mixture thereof. Examples of the cyclic polycarboxylic acids or their functional equivalents are o-phthalic acid, isophthalic acid, terephthalic acid, o-hexahydrophthalic acid, m-hexahydrophthalic acid, p-hexahydrophthalic acid, tetrahydrophthalic acid or a hydrocarbyl-substituted hexahydrophthalic acid wherein the hydrocarbyl group can be alkyl, alkenyl or aryl group.

Examples of the acyclic polycarboxylic acids are those containing from at least 2, preferably about 2 to 36 carbon atoms. Examples thereof include succinic acid, dodecenyl succinic acid, glutaric acid, adipic acid, suberic acid, sebacic acid, fumaric acid and maleic acid, as well as the so-called dimer acids.

Also useful herein are functional equivalents of the acids, e.g., anhydrides such as phthalic anhydride, hexahydrophthalic anhydride and trimellitic anhydride, or lower alkyl esters such as dimethyl o-phthalate or dimethyl adipate. The use of dicarboxylic acids is preferred. Higher functional polycarboxylic acids such as trimellitic acid or functional equivalents thereof, although not preferred, can be used, preferably in admixture with the dicarboxylic acids.

The reaction of the starting polyol and the polycarboxylic acid or a functional equivalent thereof is an esterification reaction. Typically, the esterification reaction is conducted over a temperature range of 150° to 210° C. and is usually carried to completion or near completion. If desired, however, the esterification reaction can be terminated at any point by, say, cooling the reaction mixture. The unreacted acid groups or functional equivalents thereof may be removed from the reaction product by physical means, or reacted chemically. Preferably, the acid group is reacted with a reagent which is more reactive towards the acid group than the hydroxyl group of the reaction product. The following is illustrative of such reactions.

A polyol and a polycarboxylic acid or the anhydride thereof can be esterified at temperatures of about 200° to 210° C. to a specific acid number which is higher than required of the final reaction product. The acid groups are then reacted with an epoxide to the desired acid number. Illustrative examples of the epoxides are 1,2-epoxides such as ethylene oxide, propylene oxide, allyl glycicyl ether or CARDURA E which is a glycidyl ester of VERSATIC 911 acid available from Shell Chemical Company. The reaction product comprises a polyester polyol and unreacted polyol which can be removed therefrom. If desired, the resultant polyester polyol can be further reacted with a co-reactant such as a diisocyanate before or after the unreacted polyol is removed.

Also, the starting polyol can be reacted with an anhydride at temperatures of about 80° to 120° C. such that only ring opening of the anhydrides takes place. At temperature of about 140° C., an epoxide is reacted with acid groups resulting from the above reaction of the polyol and the anhydride, to a desired acid value. At these temperatures, esterification reaction, involving the hydroxyl groups and acid groups, is minimized. The reaction product comprises a polyester polyol and unreacted polyol which can be removed therefrom. If desired, the resultant polyester polyol can be reacted further before or after the unreacted polyol is removed.

The ratios of reactants in accordance with this invention are such as would yield a reaction product containing a "significant" or "significantly high" amount of unreacted starting polyol. The significant amount is about 5 percent, typically 10 percent or higher, preferably about 15 percent, and more preferably about 30 percent or higher unreacted starting polyol. The particular ratios of reactants depend on the nature of the reactants, the desired molecular weight and/or molecular weight distribution, the extent of the reaction and the like.

Illustratively, to obtain polyester polyols containing a "significant amount" of unreacted starting polyols, i.e., about 5 percent, preferably about 15 percent, and more preferably about 30 percent, the starting diol and the dicarboxylic acid or a functional equivalent thereof are reacted in mole ratios of 1.5 to 15:1 and preferably 2.0 to 4:1, wherein the reaction is carried essentially to completion.

To obtain polyester polyols containing a "significantly high" amount of unreacted starting polyol, i.e., about 16 percent and preferably 21 percent or higher, the starting diol and the dicarboxylic acid or a functional equivalent thereof are employed in mole ratios of about 2.3 to 15:1 and preferably 2.3 to 4:1, wherein the reaction is carried essentially to completion.

As would be realized, for the same extent of reaction, the higher the ratios of starting polyols and for that matter the higher the amount of unreacted starting polyol, the lower is the kettle yield of the polyester polyol when the unreacted starting polyol is removed. It has been found that with the unreacted starting polyols removed, some of the polyesters have a marked tendency to crystallize. These crystalline polyesters, it should be noted, are particularly suitable for slurry or powder coatings.

The following is a description of the process of removing the unreacted starting polyols. Removal of the unreacted starting polyols is typically effected by means such as a distillation process. This process is generally known in the art. It entails removing the unreacted polyol from the reaction product by vaporization and condensation. Typically, the distillation is conducted at reduced pressure and at temperatures below the atmospheric boiling point of the reaction mixture.

Illustratively, a glycol which has a low boiling point and which does not crystallize at room temperature can be removed as follows. A reaction product comprising same is heated to a pot temperature of about 100° C. and the distillation apparatus is depressurized below atmospheric pressure to about 300 to 0.01 torr. After the depressurization, heating is continued typically over the range of 100° to 150° C. pot temperature until the required amount of glycol is removed. Higher temperature ranges can be employed if there is no further reaction of the resinous polyol. To facilitate the removal of the glycol, there may be introduced into the heating vessel a carrying means for the unreacted glycol.

An unreacted glycol which crystallizes at room temperature can be removed by employing a relatively high absolute reduced pressure of about 100 torr, a pot temperature of about 150° C., using a condenser coolant at a temperature which will effect condensation of the glycol. Said temperature is typically above the melting point of the glycol in the distillation apparatus.

It is a distinct feature of the invention that by using large excess starting polyol, followed by removing the unreacted starting polyols, one is able to prepare batches of the polyester polyol more reproducibly. Heretofore, when polyester polyols are prepared with limited excess of polyol, they may yield products of varying molecular weight. This is due to possible significant variations in the amount of unreacted starting polyol in the reaction vessel. The factors responsible for these variations include overcharging or undercharging of the polyol, the flow rate of the inert gas which is generally present during the preparation of the polyester polyols, reactor design, temperature variations or the like.

Thus, in preparing high molecular weight polyester polyols from a glycol and a dicarboxylic acid, the reaction progress is usually followed by recording acid value/viscosity profiles. The mole ratio of glycol to dicarboxylic acid is intended to be about 1:1 and a slight excess of the glycol is often employed. Excessive glycol loss or a significant glycol overcharge can be readily noted if the acid value/viscosity profile obtained does not coincide with that normally observed.

In preparing low molecular weight polyester polyols, however, the viscosity often remains essentially unchanged throughout the course of the reaction. Therefore, acid value/viscosity profiles can no longer be used as an indicator for excessive glycol loss or overcharge. This is especially the case if higher glycol:acid ratios are used. If the glycol/acid ratios are sufficiently high, however, the glycol loss or overcharge which may occur will not critically affect the molecular weight of the final product. On removing all or a portion of this unreacted glycol, one is left with a product which is substantially consistent from batch to batch. By the present invention, essentially all of the unreacted polyol can be removed from the reaction product. If needed, specific types and/or amounts of polyols can be post-added to impart desired performance properties, say, in a cured film obtained therefrom.

It has also been found that the variation in the amount of unreacted polyol could significantly affect coating performance, as to the degree of cure of coating compositions thereof or specific coating properties. Consider, for example, the reaction between 2 moles of a diol of molecular weight 104 and one mole of a diacid of molecular weight 172 to acid value 0 as shown in Table I. Although the weight percent unreacted diol in the reaction product is only 14.4 percent, this diol represents 50 mole percent of the product or 50 percent of the hydroxyl groups of the reaction product. Thus, variations in the percent of unreacted diol in the reaction product may significantly affect the number of hydroxy groups available to participate in the curing reaction process. The amount of unreacted starting diol which participates in the curing reaction process, in contrast with the amount which may volatilize, depends on factors such as volatility of the unreacted diol, the quantity present, the nature of the hydroxyl groups thereof, cure temperature, catalyst level, film thickness, etc. Illustratively, when the level of curing catalyst is low, the curing temperature will be high. Thus, many glycols will be evaporated before the curing takes place.

Removal of most of the unreacted starting polyol provides a means of securing a more consistent product. By this invention, the unreacted starting polyol content of the polyester polyol can be controlled very accurately. Consonantly, the crosslink density of curable compositions containing same can be controlled.

It is of interest that the GPC of the reaction product from which the unreacted starting glycol has been removed does not show the expected, i.e., the same, statistical distribution as reaction products containing the unreacted starting polyol. In effect, the aspect of the distribution ascribable to the unreacted starting polyol is absent from the GPC.

The resultant polyester polyols with the unreacted starting polyols removed have a number average molecular weight of up to about 1000 and preferably from about 200 to 600. The hydroxyl value is about 100 and preferably from about 150 to 500. The solids content can be from 85 to 100 and preferably 95 to 100 percent. The hydroxyl value will be higher and the solids content will be lower for reaction products from which the unreacted starting polyol is not removed. Preferably, the hydroxyl value is greater than or equal to 500.

Further reaction of the polyester polyol is preferably with polyisocyanates so as to form polyester-urethane polyols. The polyester polyols can be reacted with polyisocyanates in an equivalent ratio of 0.02 to 0.8:1. For high solids applications, it is preferred that the number average molecular weight of the polyester-urethane polyol be up to about 1500 and preferably from about 500 to 900. The hydroxyl value is about 75 and preferably from about 125 to 225.

In measuring the molecular weight using glycols as the standard, a Waters Associate gel permeation chromatograph was used. One Varian Micro Pak TSK 1000H exclusion column available from Varian Instrument Group, Walnut Creek, Calif., U.S.A., was used. This column has the dimensions of 50 centimeters long and 7.5 millimeters inside diameter. A differential refractometer was used as detector. Tetrahydrofuran was used as a solvent with a flow rate of 1.0 milliliters/minute. The quality of the column is checked by its "theoretical plate number" determined from ortho-dichlorobenzene and the column with theoretical plate number greater than 8000/50 cm was used.

To determine molecular weight by gel permeation chromatography (GPC), the instrument is first calibrated using glycol standards. Glycol standards were purchased from Polymer Laboratories Ltd., Church Stretton, U.K. The weight average molecular weights of the glycol standards used were 998, 425 and 76 for polyethylene glycol, polyethylene glycol and propylene glycol, respectively. To obtain a calibration curve, a set of 2 percent by volume glycol solutions in tetrahydrofuran were prepared and a 75 microliters sample size was injected into the column and a GPC chromatogram was obtained. A linear least square fit of $\log_{10}$ (molecular weight) versus elution time of each standard is used as a calibration curve. The sample whose molecular weights are to be determined was prepared as a 1.0 percent per volume tetrahydrofuran solution. After filtration through a 0.5 micron filter, available from Gelman Corporation, Catalog No. 4219, a 75 microliters sample size was injected into the columns and a GPC chromatogram obtained under the same experimental conditions as the calibration. The chromatogram is divided into vertical segments of equal elution volume of approximately one milliliter and the height of each segment (Hi) and the corresponding molecular weight (Mi) obtained from the calibration curve are used to calculate the number average molecular weight (Mn) according to the equation:

$$Mn = \sum_{i=1}^{i} Hi / \sum_{i=1}^{i} (Hi/Mi)$$

The weight average molecular weight (Mw) is calculated according to the equation:

$$Mw = \Sigma HiMi/\Sigma Hi$$

The molecular weight distribution or polydispersity is calculated according to the equation $\overline{Mw}/\overline{Mn}$.

In the practice of the invention, the polyester polyols, or the modified forms thereof, can be employed in combination with a curing agent which is capable of reacting with the active hydrogens in the former so as to give thermosetting compositions. Examples of the curing agent are aminoplasts and isocyanates (blocked or unblocked). Usually, a cure catalyst is employed therewith.

Aminoplast condensates are obtained from the reaction of formaldehyde with an amine or an amide. The most common and preferred amines or amides are melamine, urea or benzoguanamine. However, condensates with other amines and amides can be employed, for example, aldehyde condensates of diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotrazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuraldehyde may be used.

The aminoplast contains methylol or similar alkylol groups and preferably at least a portion, and more preferably all, of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butylstannoic acid.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Mobay Chemical Company as DE-SMODUR N. The polyisocyanate can be blocked with suitable blocking agents which would unblock at elevated temperatures such as low aliphatic alcohols such as methanol, oximes such as methyl ethyl ketone oxime, and lactams such as caprolactam.

The amounts of resinous polyol or the modified form thereof and curing agent which are used in the practice of the invention are preferably adjusted so that the weight ratio of the resinous polyol:curing agent is within the range of 6 to 0.5:1, preferably 3 to 1:1.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention can be of the high solids type, a liquid diluent is usually present in the composition. By liquid diluent is meant a solvent or non-solvent which is volatile and is removed after the coating is applied and is needed to reduce viscosity sufficiently to enable one, by simple coating techniques, namely, spraying, to spread the coating to controllable, desired and uniform thicknesses. Also, diluents assist in substrate wetting, resinous component compatibility, package stability and film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts of up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants, and other formulating additives can be employed if desired. These materials are optional and generally constitute up to about 20 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings can be useful on resilient and rubbery substrates, elastomeric parts, plastics, or on metal surfaces such as steel and aluminum.

The following examples further illustrate the invention.

EXAMPLE 1

Part 1

A polyester polyol of the present invention was prepared, as follows:

| Ingredients | Parts by Weight (grams) | Moles |
|---|---|---|
| Hexahydrophthalic anhydride | 7165.2 | 46.53 |
| 1,6-Hexanediol | 5493 | 46.55 |
| Neopentyl glycol | 4841.6 | 46.55 |

The above ingredients were charged to a reaction vessel comprising a flask equipped with a stirrer, nitrogen inlet tube, thermometer, steam jacket column, fractionating column, and a distillation head connected to a condenser and a receiver. The resultant mixture was heated to react in a nitrogen atmosphere. At 180° C., there resulted the production of water of (esterification) reaction. With the continuous removal of the water, heating was continued to 200° C. The reaction mixture was then held at 200° C. for about 9 hours until an acid value of about 10.1 was attained. The reaction product was then cooled, discharged and analyzed. The determined solids content was 83.1, viscosity was 85.0 stokes, acid value was 9.8, hydroxyl value was 315.2, Mn was 537, Mw was 654 and Mw/Mn was 1.22. Estimated unreacted glycol content based on the solids content was 16.9 percent. Estimated unreacted glycol by GPC was 11.8 percent.

Part 2

Unreacted glycol was removed from the above reaction product comprising a polyester polyol by vacuum distillation.

The distillation apparatus used herein comprised of a vessel (or pot), a condenser(s), a receiver(s) and vacuum source as described more fully below.

DESCRIPTION OF THE APPARATUS

The vessel comprised of a 4-neck flask equipped with a stirrer, addition funnel, a thermometer for measuring pot temperatures and a (CLAISEN type) adaptor. The adaptor was connected to a condenser (FRIEDRICH type, herein referred to as Condenser 1). The adaptor was equipped with two thermometers for measuring head temperatures at point (A) closer to the pot and point (B) closer to Condenser 1.

As a condensing means for glycol-rich vapors, water at room temperature or higher temperatures or steam was used in Condenser 1. A receiver which was a 3-neck flask (herein referred to as Receiver 1) was attached to the Condenser 1. By means of a U-shaped connecting adaptor, Receiver 1 was connected in series to another receiver which was also a 3-neck flask (herein referred to as Receiver 2). Receiver 2 was connected to another condenser (ALLIHN type, herein referred to as Condenser 2). As a condensing means for water-rich vapors, water at ambient temperature was used in Condenser 2. To this condenser was attached yet another condenser (DEAN type) which functioned as a trap for materials that might lead into a vacuum source attached thereto.

The Distillation Process 16.170 grams of the reaction product of Part 1 were charged to the flask of the apparatus described hereinabove. The contents of the flask were heated to 120° C. and the apparatus was placed under vacuum at a pressure of about 40 torr. Soon after, water was introduced into the system through a dropping funnel. At this stage, the head temperature at point (A) was 50° C., the head temperature at point (B) was 27° C. At a pot temperature of 130° C., distillate began to condense in both Condensers 1 and 2. Condenser 1 was kept at a temperature of 25° C. by means of water and stream. Condenser 2 was kept at ambient temperature of water. The reduced pressure was 40 torr, the heat temperatures at points (A) and (B) were 100° C. and 65° C., respectively, and the distillate was being collected in Receivers 1 and 2.

Heating was continued and in 35 minutes, the pot temperature had increased to 168° C. At this point, the distillate was being condensed and collected in Receiver 1 at a rate greater than 300 drops per minute. The amount of distillate in Receivers 1 and 2 was about 800 grams and 250 grams, respectively. The rate of water addition was 60 drops per minute. The temperature of cooling water in Condenser 1 was at 25° C. The head temperatures at points (A) and (B) were 135° and 130° C., respectively. Heating was continued during the next hour with a pot temperature increasing to 178° C. At this stage water was being added to the flask at a rate of 64 drops per minute. The distillate of glycols was being condensed (at 35° C.) and collected into Receiver 1 at a rate of 240 drops per minute. Water was being condensed and collected into Receiver 2 at a rate of 60 drops per minute.

The head temperatures were 140° C. and 115° C., respectively. The temperature of the pot was held over 4½ hours at 170° to 180° C. After this, the distillation process was stopped by cooling the contents of the flask. During the final stages of the distillation, water was being introduced into the flask at a rate of 100 drops per minute, the mixture of glycols was being condensed (at 68° C.) into Receiver 1 at a rate of 40 drops per minute. Water was being condensed into Receiver 2 at a rate of 100 drops per minute. The head temperatures at (A) and (B) were 118° C. and 90° C., respectively.

A total of 1500 grams of water was added to the flask during the distillation process. 2240.5 grams of distillate were collected in Receiver 1. 1284.4 grams of distillate were collected into Receiver 2.

Thereafter, the reaction was heated to 170° C. for about two hours under reduced pressure of 45 torr. The rate of water addition was 80-100 drops per minute, with distillate being collected in the receivers. At this point, the determined solids at 105° C. was 96.6 percent, hydroxyl value was 195.6, estimated unreacted starting glycol content based on the solids content was 3.4 percent, Mn was 560, Mw was 678 and Mw/Mn was 1.21. Estimated unreacted starting polyol by GPC was 4.09 percent.

EXAMPLE 2

Part 1

A polyester polyol was prepared, as follows:

| Ingredients | Parts by Weight (grams) | Moles |
|---|---|---|
| Neopentyl glycol | 6240 | 60.00 |
| Phthalic anhydride | 2220 | 15.00 |
| Butylstannoic acid (0.02%) | 1.7 | |

To a reaction vessel such as described in Example 1, Part 1, was charged the glycol and anhydride and the butylstannoic acid which were heated to react in a nitrogen atmosphere. At 166° C., water of esterification began to distill over. Over a period of three hours, the temperature of the vessel rose to 210° C. The reaction product was held at 210°-212° C. until an acid value of 4.9 was attained. The resultant product was then cooled and analyzed. The reaction product had an acid value of 3.1, hydroxyl value of 613.2 and a determined solids content of 51.5 percent. Estimated unreacted neopentyl glycol content based on the solids content was 48.5 percent.

Part 2

Unreacted glycol was removed from the above reaction product by vacuum distillation in essentially the same manner as described in Example 1, Part 2, and summarized hereinbelow.

8135 grams of the reaction mixture were charged to the distillation vessel and heated. At 152° C. vessel temperature, a reduced vacuum pressure of 120 torr was applied and addition of water was started. Heating was continued over 165°–180° C., reduced vacuum pressure range of 115 to 50 torr. Heating and introduction of water were continued and the resulting mixture of glycol and water was distilled. The distillation was terminated after 1320 grams of water had been introduced into the vessel and 4595 grams of distillate had been collected.

Determined resin solids content of the reaction product was 97.0 percent, viscosity was 65.7 stokes, acid value was 3.7, hydroxyl value was 299.6; estimated unreacted neopentyl glycol based on the solids content was 3 percent; Mn was 416, Mw was 461, and Mw/Mn was 1.108.

EXAMPLE 3

This example illustrates a polyester polyol prepared from the dimethylester of a dicarboxylic acid followed by removing unreacted glycol from the reaction mixture.

Part 1

The polyester polyol composition was prepared, as follows:

| Ingredients | Parts by Weight (grams) | Moles |
|---|---|---|
| Trimethylpentanediol | 6920.4 | 47.4 |
| Dimethyl terephthalate | 3065.2 | 15.8 |
| Dibutyltin oxide | 6.4 | |

The above ingredients were charged to a 12-liter flask equipped with a heating mantle, stirrer, immersion thermometer, nitrogen sparge tube and a steam jacketed column with a distillation head at its top for removal of methanol of reaction. The mixture of ingredients was heated under a nitrogen atmosphere. At 172° C. flask temperature, methanol generated from the transesterification reaction began to distill from the reaction mixture. About 7½ hours later, 995 grams of distillate had been collected. The pot temperature had gradually climbed to 193° C. The resultant product was cooled, discharged and analyzed.

Determined solids content was 65.1 percent, hydroxyl value was 371.5; estimated unreacted trimethylpentanediol was 34.9 percent; Mn was 511, Mw was 596 and Mw/Mn was 1.166.

Part 2

Unreacted trimethylpentanediol was removed from the reaction product by vacuum distillation. The distillation process was essentially as described herein. The following is a summary of the distillation process.

8360 grams of the reaction product were charged to the vessel of the distillation apparatus, heated, and a vacuum was applied. At a pot temperature of 93° C., distillate began to condense and was collected in Receivers 1 and 2. At this point, the applied reduced pressure was 40 torr, the head temperatures at (A) and (B) were 68° C. and 58° C., respectively. At a pot temperature of 145° C., the vacuum was broken and the distillate in Receiver 1 was removed. A reduced pressure of 42 torr was then reapplied and heating was continued to a pot temperature of 175° C. The head temperatures at (A) and (B) were 144° C. and 143° C., respectively, and the applied reduced pressure was 41 torr. About 2100 grams of distillate had been collected in Receiver 1 and very little distillate was in Receiver 2. At this stage, water was added to the pot through a dropping funnel at about 30 drops per minute. The pot temperature was maintained at 175° to 180° C. for about 2 hours. Over this period, the head temperature at (A) fell from 144° C. to 96° C., while that at (B) fell from 143° C. to 94° C. During this time, water was added as necessary to maintain a distillation rate of at least 10 cc per minute. The water addition rate ranged from 19 to 77 drops per minute. A total of 290 mils of water was added. The reduced pressure during this period was 41 torr. The total amount of ditillate was 2884 grams in Receiver 1 and 347 grams in Receiver 2. (This includes the 130 mils removed earlier.) The product was discharged and analyzed. The determined solids was 98.9 percent, estimated unreacted starting diol was 1.1 percent, hydroxyl value was 201.3, Mn was 564, Mw was 660 and Mw/Mn was 1.170. The material was thinned with methyl isobutyl ketone to 90 percent theoretical solids to give a viscosity of 166 stokes.

EXAMPLE 4

This example shows methods of preparing and using the polyester polyols of this invention.

Part 1

A polyester polyol was prepared in essentially the same manner as described in Example 1, Part 1. The following were used in the preparation.

| Ingredients | Parts by Weight (grams) | Moles |
|---|---|---|
| Hexahydrophthalic anhydride | 1515 | 9.84 |
| 1,6-Hexanediol | 1161 | 9.84 |
| Neopentyl glycol | 1023 | 9.84 |

The reaction product had a determined solids content of 85.2 percent, viscosity of 88.8 stokes, acid value of 9.5, hydroxyl value of 310.3; estimated unreacted starting polyol based on solids content was 14.8 percent; Mn was 539, Mw was 658 and Mw/Mn was 1.22.

Part 2

Unreacted starting glycol was removed from the reaction product in essentially the same manner as described in Example 1, Part 2. The resultant product had a determined solids content of 97.0 percent, viscosity of 300 stokes, acid value of 10.55, hydroxyl value of 202.7; estimated unreacted starting polyol based on solids content was 3 percent; Mn was 493, Mw was 636 and Mw/Mn was 1.29.

Part 3

A polyester-urethane polyol was prepared with the above polyester polyol.

| Ingredients | Parts by Weight (grams) |
|---|---|
| The polyester polyol (as described above) | 900 |
| Trimethylhexamethylene diisocyanate | 100 |
| Dibutyltin dilaurate | 0.1 |
| Methylisobutyl ketone | 111 |

The above ingredients were charged to a properly equipped reaction vessel and the resultant mixture heated to react in a nitrogen atmosphere to a temperature of 110° C. The reaction mixture was held at this temperature for about 2½ hours until all the isocyanate had reacted. The resultant composition was discharged and analyzed.

Analysis: Determined solids content was 89.5 percent, acid value was 8.69, hydroxyl value was 107.6 and viscosity was 114 stokes.

Part 4

A coating composition was formulated with the above polyester-urethane polyol, an aminoplast curing agent and other ingredients as listed below.

| Ingredients | Parts by Weight (grams) | Solids |
|---|---|---|
| The polyester-urethane composition | 85.6 | 77 |
| Melamine[1] | 20 | 20 |
| Polymeric microparticles[2] | 4.55 | 2.0 |
| Cellulose acetate butyrate | 4 | 1 |
| U.V. absorber[3] | 2 | 2.0 |
| Flow control agent | 0.5 | |
| U.V. stabilizer[4] | 2 | 0.5 |
| Dodecylbenzene sulfonic acid | 2 | 0.4 |
| Thinning solvent[5] | 60.1 | |

[1]RESIMINE 745 available from Monsanto Company.
[2]Prepared as described in Example II of U.S. Pat. No. 4,147,688.
[3]Available from Ciba-Geigy Company as TINUVIN.
[4]Available from Ciga-Geigy Company as TINUVIN in combination with dodecylbenzene sulfonic acid and isobutanol.
[5]Methyl amyl ketone/SOLVESSO 100 (available from Union Carbide Co.)/methyl ethyl ketone/isobutyl acetate.

The coating composition having a sprayable resin solids content of 57 percent by weight was sprayed on a ⅛-inch thick thermoplastic polyurethane commercially available from Mobay as TEXIN 355D. The coating was baked at 121° C. for 30 minutes and then subjected to flexibility tests comprising a ¼-inch mandrel bend at room temperature so as to assess overbake tolerance.

The test comprised further baking the coated substrate (already baked at 121° C. for 30 minutes) at 121° C. and cooling to room temperature at 30-minute intervals. When the substrate was cooled to room temperature, it was subjected to flexibility tests comprising a ¼-inch mandrel bend at room temperature as aforedescribed. After 2 hours of the intermittent heating and cooling, the substrate passed the flexibility test in that it withstood ¼-inch mandrel test at room temperature without a substantial break or crack.

This aspect of the invention and others described herein are not intended to be limiting as to the scope and content of the claimed invention. Within the scope of the following claims, it is to be understood that the invention can be practiced otherwise than as specifically described herein.

What is claimed is:

1. A polyester polyol having a number average molecular weight of up to about 1000 which is prepared by reacting a low molecular weight starting polyol with a polycarboxylic acid or a functional equivalent thereof, wherein the starting polyol is in an amount sufficient to produce a reaction product containing about 16 percent or higher of unreacted starting polyol.

2. A polyester polyol having a number average molecular weight of up to about 1000 which is prepared by reacting:
   (a) a glycol with
   (b) a dicarboxylic acid, an anhydride or a lower alkyl ester thereof;
the mole ratio of the glycol to the dicarboxylic acid, an anhydride or a lower alkyl ester thereof is about 2.3 to 15:1, wherein the reaction is carried essentially to completion.

3. A polyester polyol of claim 2, wherein the mole ratio is 2.3 to 4:1.

4. A polyester polyol of claim 2, wherein the starting glycol is selected from the group consisting of diethylene glycol, neopentyl glycol, 1,6-hexanediol, trimethylpentanediol, 1,4-cyclohexanediol and 1,4-cyclohexanedimethanol, or a mixture thereof.

5. A polyester polyol of claim 2, wherein the dicarboxylic acid is selected from the group consisting of adipic acid, glutaric acid, hexahydrophthalic acid, phthalic acid, and a mixture thereof.

6. A polyester polyol having a number average molecular weight of up to about 1000 which is prepared by:
   (1) reacting a low molecular weight starting polyol with a polycarboxylic acid or a functional equivalent thereof, wherein the starting polyol is in an amount sufficient to produce a reaction product containing about 5 percent or higher of unreacted starting polyol; said reaction is followed by
   (2) removing about 30 percent by weight of the unreacted starting polyol, under essentially non-reacting conditions.

7. A polyester polyol of claim 6, wherein the reaction product of (1) contains about 15 percent unreacted starting polyol.

8. A polyester polyol of claim 7, wherein the reaction product of (1) contains about 30 percent unreacted starting polyol.

9. A polyester polyol having a number average molecular weight of up to about 1000 which is prepared by:
   (1) reacting:
      (a) a glycol with
      (b) a dicarboxylic acid, a lower alkyl ester or an anhydride thereof;
the mole ratio of the glycol to the dicarboxylic acid is 1.5 to 15:1; followed by
   (2) removing about 30 percent by weight of the unreacted glycol, under essentially non-reacting conditions.

10. A polyester polyol of claim 9, wherein the mole ratio of the glycol to the dicarboxylic acid, a lower alkyl ester or an anhydride thereof is about 1.7 to 15:1, wherein the reaction is carried essentially to completion.

11. A polyester polyol of claim 10, wherein the mole ratio is from about 2 to 4:1.

12. A polyester polyol of claim 9, wherein the glycol is selected from the group consisting of diethylene glycol, neopentyl glycol, 1,6-hexanediol, trimethylpentanediol, 1,4-cyclohexanediol and 1,4-cyclohexanedimethanol, or a mixture thereof.

13. A polyester polyol of claim 9, wherein the dicarboxylic acid is selected from the group consisting of adipic acid, glutaric acid, hexahydrophthalic acid and phthalic acid.

14. A polyester polyol of claim 9, comprising a polyester polyol having a resin solids content of 85 to 100.

15. A polyester polyol of claim 14, having a resin solids content of 95 to 100.

16. A polyester-urethane polyol which is prepared by reacting a polyester polyol with a polyisocyanate; the polyester polyol is formed by:

(1) reacting a glycol with a dicarboxylic acid, an anhydride or a lower alkyl ester thereof, wherein the glycol is in an amount sufficient to produce a reaction product containing about 5 percent or higher of unreacted glycol; followed by (2) removing at least about 30 percent by weight of the unreacted glycol under essentially non-reacting conditions.

17. A polyester-urethane polyol of claim 16, wherein the polyisocyanate is a diisocyanate comprising trimethylhexamethylene diisocyanate.

18. A polyester-urethane polyol of claim 16, wherein the polyisocyanate and the polyester polyol are reacted in the equivalent ratio of 0.02 to 0.8:1.

* * * * *